(12) United States Patent
Shibata et al.

(10) Patent No.: US 9,323,839 B2
(45) Date of Patent: Apr. 26, 2016

(54) CLASSIFICATION RULE GENERATION DEVICE, CLASSIFICATION RULE GENERATION METHOD, CLASSIFICATION RULE GENERATION PROGRAM, AND RECORDING MEDIUM

(75) Inventors: Hideya Shibata, Tokyo (JP); Mamoru Kato, Tokyo (JP); Mitsunori Kori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 153 days.

(21) Appl. No.: 13/996,040

(22) PCT Filed: Jan. 13, 2011

(86) PCT No.: PCT/JP2011/050384
§ 371 (c)(1),
(2), (4) Date: Jun. 20, 2013

(87) PCT Pub. No.: WO2012/095971
PCT Pub. Date: Jul. 19, 2012

(65) Prior Publication Data
US 2013/0275433 A1    Oct. 17, 2013

(51) Int. Cl.
G06F 17/30    (2006.01)
(52) U.S. Cl.
CPC ...... G06F 17/3071 (2013.01); G06F 17/30011 (2013.01); G06F 17/30705 (2013.01)
(58) Field of Classification Search
None
See application file for complete search history.

(56) References Cited

U.S. PATENT DOCUMENTS

| | | | | |
|---|---|---|---|---|
| 7,469,240 B2 * | 12/2008 | Tsukamoto | ...................... | 706/48 |
| 7,747,587 B2 * | 6/2010 | Kubota et al. | ................. | 707/694 |
| 8,176,050 B2 * | 5/2012 | Inakoshi et al. | .............. | 707/737 |
| 8,311,960 B1 * | 11/2012 | Ginzburg et al. | ............... | 706/13 |
| 8,401,842 B1 * | 3/2013 | Ginzburg et al. | ............... | 704/10 |

(Continued)

FOREIGN PATENT DOCUMENTS

| | | |
|---|---|---|
| JP | 2002 133389 | 5/2002 |
| JP | 2004 234051 | 8/2004 |

(Continued)

OTHER PUBLICATIONS

Notice of Rejection issued Sep. 24, 2013 in Japanese Patent Application No. 2012-552572 (with English translation).

(Continued)

*Primary Examiner* — Sherief Badawi
*Assistant Examiner* — Christopher J Raab
(74) *Attorney, Agent, or Firm* — Oblon, McClelland, Maier & Neustadt, L.L.P.

(57) ABSTRACT

In a document classification device 100, a sample document extraction condition storage unit 160 stores sample document extraction conditions 160-1 set for each of classification categories for extracting partial text according to the classification categories from an input document 301 input by a document input unit 110. A document matching unit 120 matches the input document 301 against the sample document extraction conditions 160-1. Based on a result of matching by the document matching unit 120, a document extraction unit 130 extracts the partial text from the input document 301 according to the classification categories. A learning unit 140 performs predetermined machine learning using as a sample document the partial text extracted by the document extraction unit 120, and thereby generates classification rules 150-1.

22 Claims, 15 Drawing Sheets

(56) References Cited

U.S. PATENT DOCUMENTS

| | | | |
|---|---|---|---|
| 8,719,302 B2* | 5/2014 | Bailey et al. | 707/790 |
| 8,745,091 B2* | 6/2014 | McHenry et al. | 707/791 |
| 2005/0060643 A1* | 3/2005 | Glass et al. | 715/501.1 |
| 2010/0280981 A1 | 11/2010 | Kato et al. | |
| 2010/0312769 A1 | 12/2010 | Bailey et al. | |

FOREIGN PATENT DOCUMENTS

| | | |
|---|---|---|
| JP | 2004 287776 | 10/2004 |
| JP | 2006 099565 | 4/2006 |
| JP | 2007 172249 | 7/2007 |
| JP | 2007 272699 | 10/2007 |
| JP | 2007 323475 | 12/2007 |
| JP | 2009 163303 | 7/2009 |
| JP | 2010 072779 | 4/2010 |
| WO | 2009 087757 | 7/2009 |

OTHER PUBLICATIONS

"An Automatic Training Data Collection Method for Confidential E-mail Detection", Hideya Shibata, et al., DEIM Forum B4-1, Jun. 9, 2010, 9 pages (with English abstract).

International Search Report Issued Feb. 22, 2011 in PCT/JP2011/050384 Filed Jan. 13, 2011.

Combine Office Action issued Oct. 27, 2015 in Chinese Patent Application No. 201180064827.3 (with English translation and English translation of category of cited documents).

* cited by examiner

Fig. 9

| CLASSIFICATION CATEGORY i | TYPE ID |
|---|---|
| CONFIDENTIAL | 1 |
| SYSTEM DEVELOPMENT PLAN | 2 |

Fig. 10

| CLASSIFICATION CATEGORY 1 (POSITIVE) | CLASSIFICATION CATEGORY 2 (NEGATIVE) |
|---|---|
| KEYWORD 1-1 | KEYWORD 1-1 |
| KEYWORD 1-2 | KEYWORD 1-2 |
| ⋮ | ⋮ |
| KEYWORD 1-N | KEYWORD 1-N |

CLASSIFICATION RULE GENERATION DEVICE, CLASSIFICATION RULE GENERATION METHOD, CLASSIFICATION RULE GENERATION PROGRAM, AND RECORDING MEDIUM

TECHNICAL FIELD

This invention relates to a classification rule generation device, a classification rule generation method, a classification rule generation program, and so on for generating classification rules for classifying a document into one of a plurality of categories.

BACKGROUND ART

As a method for automatically classifying a document into one of a plurality of categories, there is automatic classification using machine learning. In the automatic classification of a document using machine learning, a document classification device learns about features of each classification category using learning sample documents which have been divided into a plurality of classification categories, and classifies a classification target document based on a result of learning.

Accordingly, the accuracy of classification of the document classification device using machine learning depends on the learning sample documents. However, it takes a lot of work to manually collect a large volume of learning sample documents that are correctly classified, so that this has been a problem in practical application. To address this problem, Patent Document 1 discloses a technique of generating learning sample documents classified into categories by performing rule-based filtering using string matching on unclassified sample documents.

CITATION LIST

Patent Document

Patent Document 1: Japanese Unexamined Patent Application No. 2010-72779

DISCLOSURE OF INVENTION

Technical Problem

However, when the size of an input unknown document is large or a plurality of topics exist in the unknown document, with the method of Patent Document 1, it is likely that even if the unknown document is determined as a sample document for a given classification category, the unknown document actually contains topics unrelated to that classification category. For example, when the input document is a Web page in which a personal journal is written, it is often the case that totally different topics are discussed depending on the date of entry. As another example, when the input document is an electronic mail message with a plurality of attached files, each of the attached files may contain totally different contents. Such unrelated topics are unnecessary information in generation of document classification conditions (classification rules) for corresponding classification categories, and may cause the accuracy of classification to be degraded.

When an entire unknown document is used as a sample for learning, the size of text to be learned may be enormous, thereby causing deterioration of system processing capability, such as a reduced learning speed or an increased size of generated classification rules.

In the present invention, rule-based filtering such as string matching is performed on an input document of an unknown category. Then, based on information obtained by execution of the filtering such as a hit position of a string, a piece of partial text which is a portion of the input document is extracted from the input document, and is used as a learning sample for generating classification rules. With this arrangement, the present invention aims to provide a classification rule generation device capable of collecting learning samples not including unnecessary information.

Solution to Problem

A classification rule generation device of the present invention includes an input unit that inputs a document as a sample target document;

a storage unit that stores extraction conditions for extracting partial text which is a portion of the sample target document and which is used for generating classification rules for classifying a classification target document to be classified into one of classification categories, the partial text being extracted from the sample target document according to the classification categories, the extraction conditions being set for each of the classification categories;

a matching unit that matches the sample target document input by the input unit against the extraction conditions stored in the storage unit;

an extraction unit that attempts to perform partial text extraction to extract the partial text from the sample target document according to the classification categories, based on a result of matching by the matching unit; and a learning unit that, when the partial text corresponding to one of the classification categories is extracted by the partial text extraction by the extraction unit, performs predetermined machine learning using the partial text extracted, and generates the classification rules.

Advantageous Effects of Invention

According to a classification rule generation device of the present invention, a classification rule generation device capable of collecting learning samples not including unnecessary information can be provided.

BRIEF DESCRIPTION OF DRAWINGS

FIG. 9 is a diagram showing type ID settings in the first embodiment;

FIG. 10 a diagram describing keyword exclusion conditions 162 in the first embodiment;

DESCRIPTION OF PREFERRED EMBODIMENTS

First Embodiment

In the following description, an example will be discussed where a document classification device 100 (an example of a classification rule generation device) is applied to a system that monitors text data flowing through a network 500 (hereinafter a network monitoring system). However, the document classification device 100 can be applied to document classification systems in general, not limited to being applied to network monitoring systems.

Figure 1:
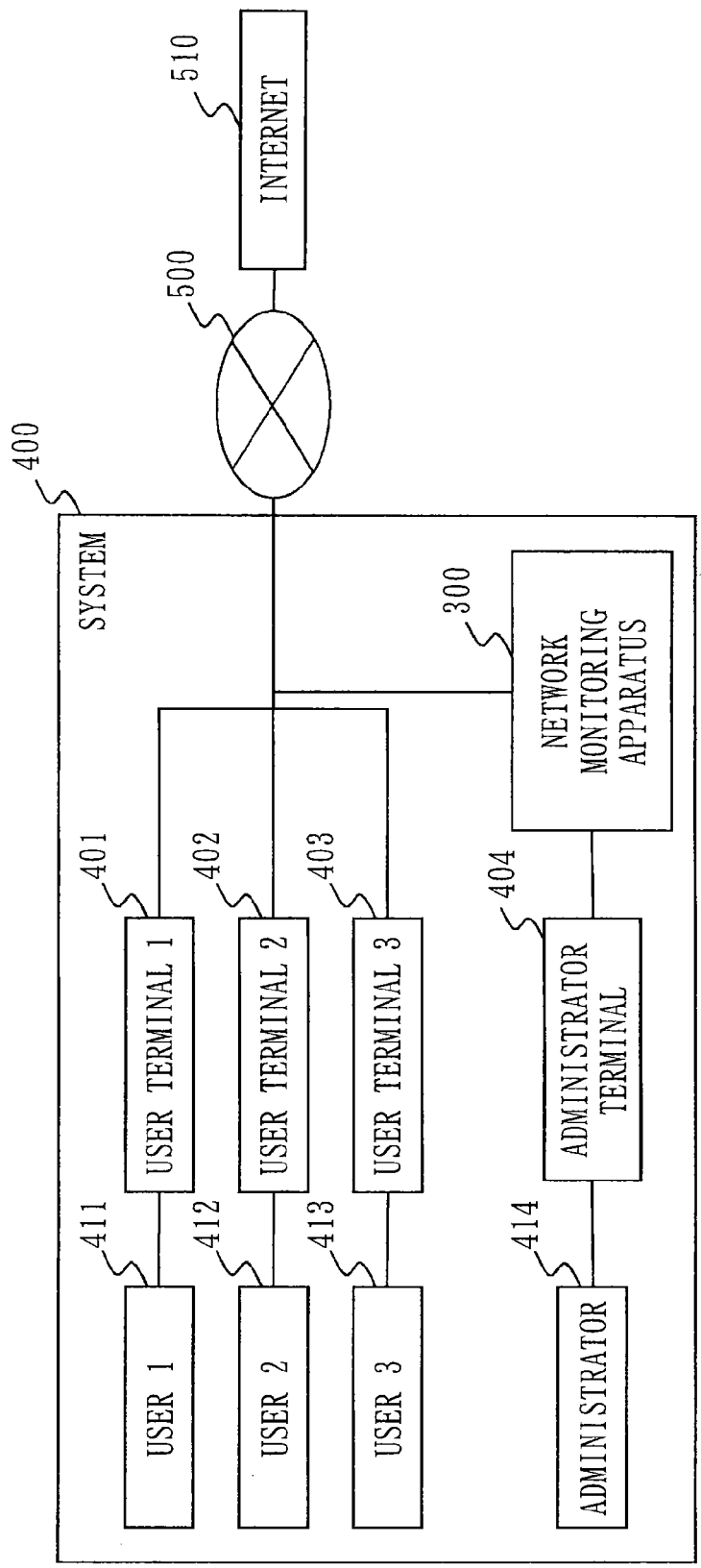
FIG. 1 is a configuration diagram of a network monitoring system in a first embodiment.

FIG. 1 is a configuration diagram where the document classification device 100 is applied to the network monitoring system. As shown in FIG. 1, a network monitoring apparatus 300 is placed on an internal network in a system 400. The system 400 is connected with an Internet 510 through the network 500.

The system 400 is configured with user terminal devices 401, 402, and 403, users 411, 412, and 413 accessing the respective user terminal devices, an administrator terminal device 404 for managing the network monitoring apparatus 300, and an administrator 414 who can access the administrator terminal device 404. The administrator 414 performs management, setting, and so on of the network monitoring apparatus 300 through the administrator terminal device 404. The number of users and the server configuration shown in FIG. 1 are examples. The document classification device 100 can be adapted for any number of users and any server configuration.

The network monitoring apparatus 300 monitors whether each user of the system 400 is using the network properly by obtaining information sent to the network 500 by each user of the system 400. The information obtained by the network monitoring apparatus 300 includes text written on the Web, electronic mail messages, and transmitted files. Monitoring processes performed by the network monitoring apparatus 300 include a process for compiling transmitted information and a text monitoring process for preventing information leakage. To implement the text monitoring process by the network monitoring apparatus 300, the document classification device 100 of the first embodiment is applied. The administrator 414 checks a result of the monitoring process performed by the network monitoring apparatus 300. If there is a user who is suspected of using the network improperly, the administrator 414 can take an action such as issuing a warning.

Figure 2:
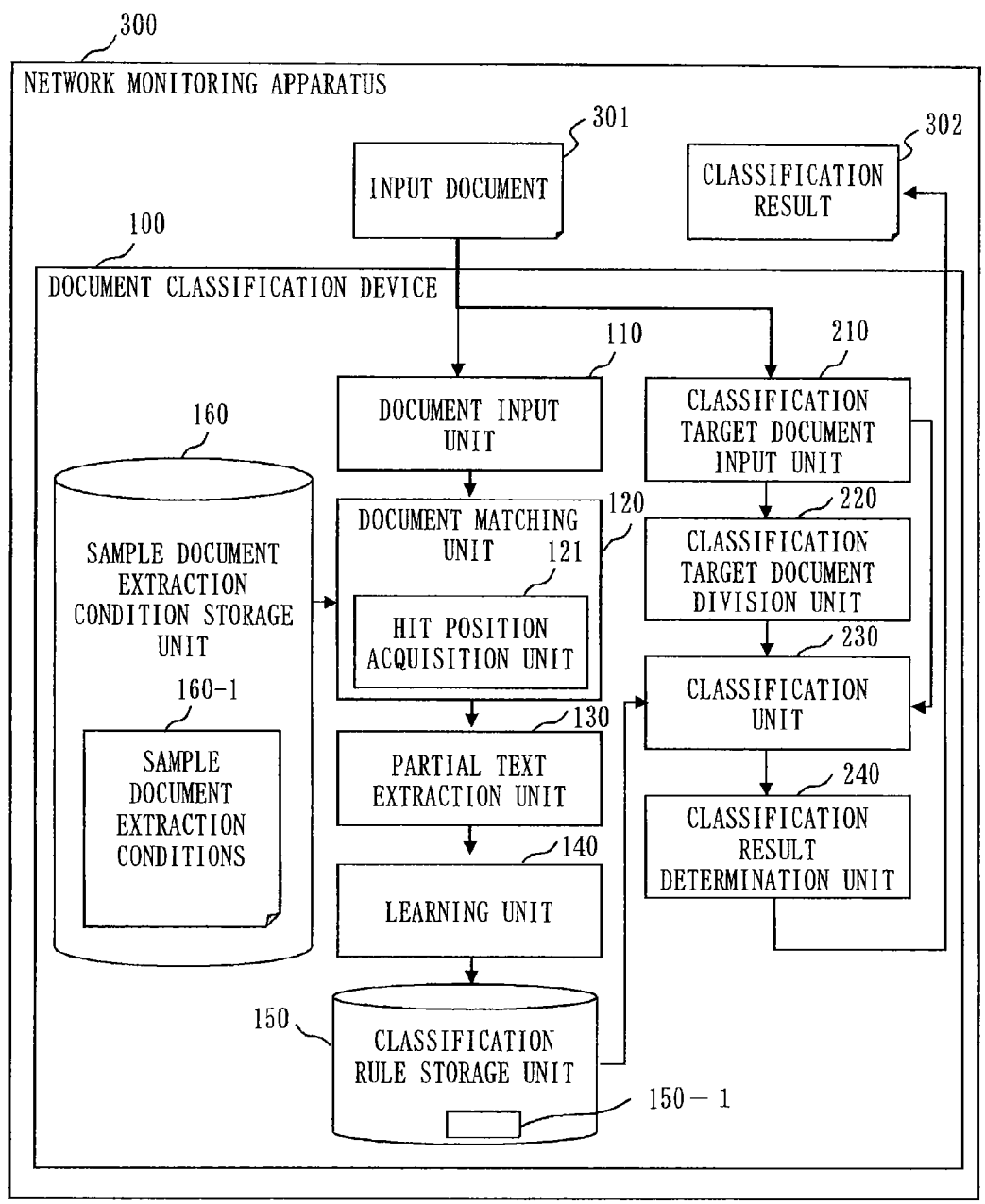
FIG. 2 is a configuration diagram of a network monitoring apparatus 300 in the first embodiment.

FIG. 2 is a configuration diagram of the network monitoring apparatus 300. Referring to FIG. 2, a configuration of the network monitoring apparatus 300 will now be described. The document classification device 100 is applied as a device included in the network monitoring apparatus 300. The document classification device 100 includes a document input unit 110 (input unit), a document matching unit 120 (matching unit), a partial text extraction unit 130 (extraction unit), a learning unit 140, a classification rule storage unit 150, a sample document extraction condition storage unit 160 based on classification categories, a classification target document input unit 210, a classification target document division unit 220 (division unit), a classification unit 230, and a classification result determination unit 240.

Figure 3:
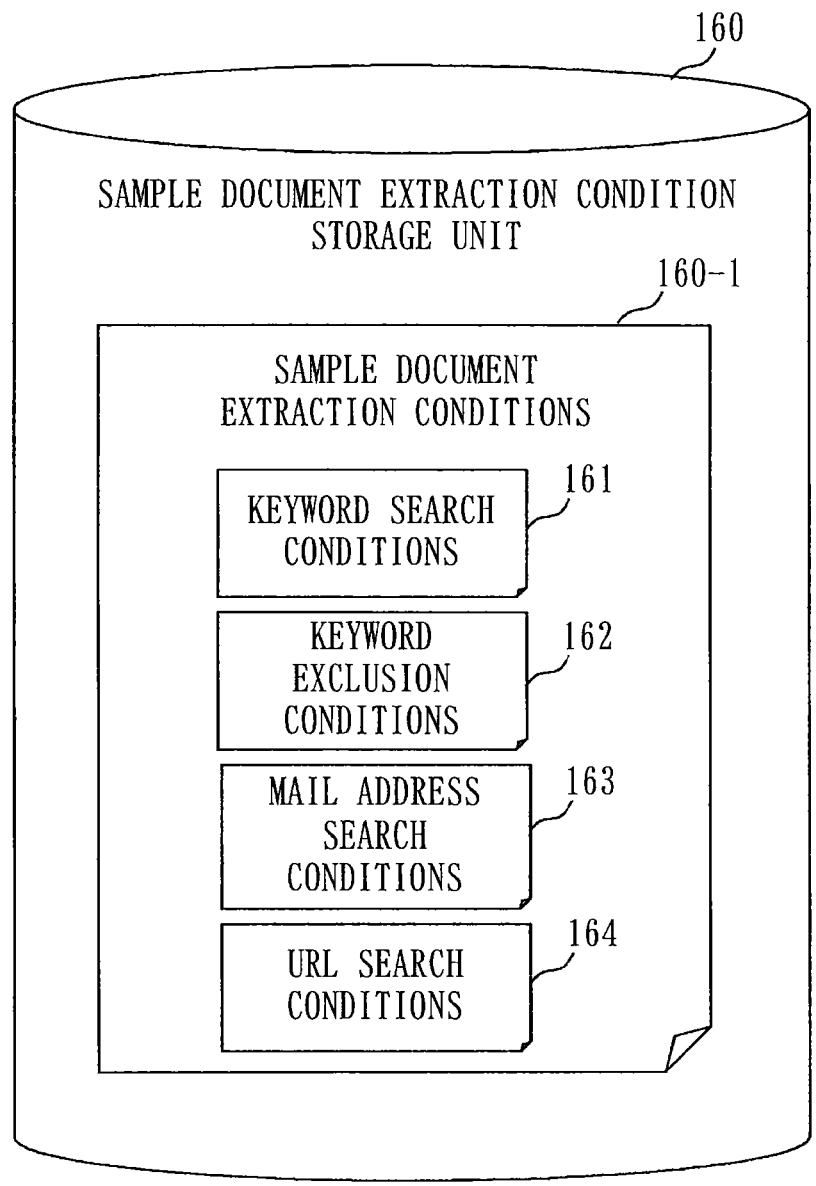
FIG. 3 is a diagram showing sample document extraction conditions 160-1 in the first embodiment.

FIG. 3 is a diagram showing an example of sample document extraction conditions 160-1 stored in the sample document extraction condition storage unit 160. As shown in FIG. 3, the sample document extraction conditions 160-1 include keyword search conditions 161, keyword exclusion conditions 162, mail address search conditions 163, URL search conditions 164, and so on. These will be described later.

Figure 4:
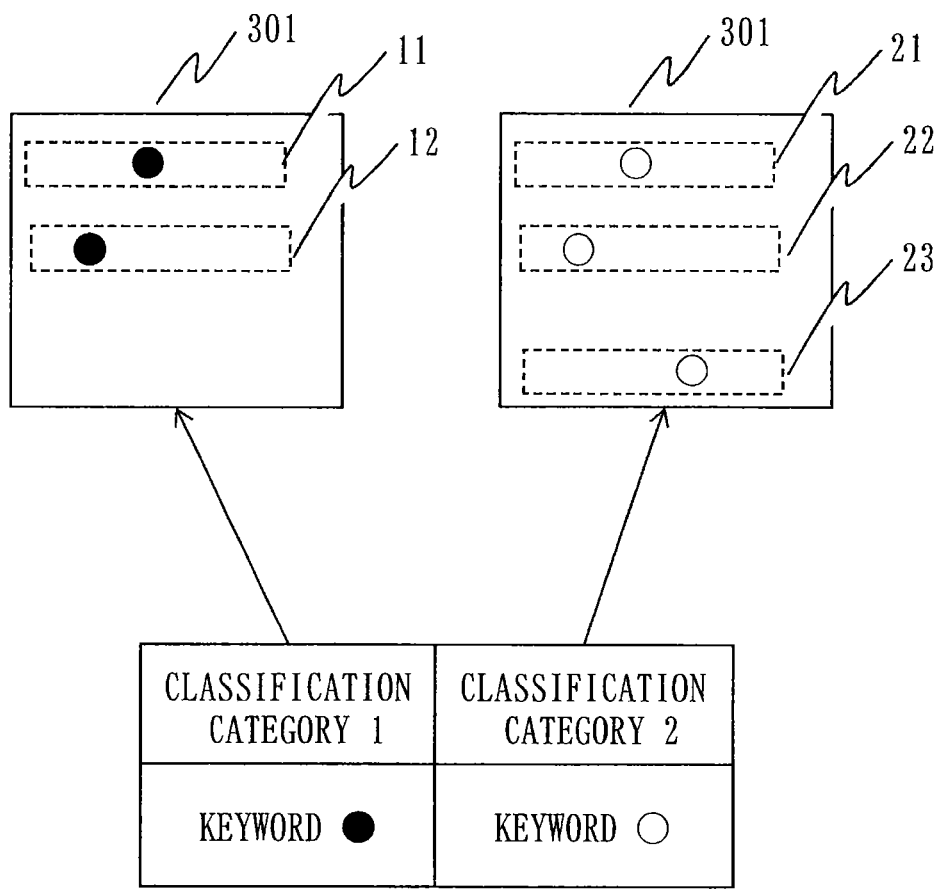
FIG. 4 is a diagram describing partial text extraction in the first embodiment.

FIG. 4 is a diagram describing features of the document classification device 100. The features of the document classification device 100 are provided mainly in the partial text extraction unit 130. Referring to FIG. 4, an overview of the features of the document classification device 100 will be described. Based on a result of matching by the document matching unit 120, the partial text extraction unit 130 attempts to perform partial text extraction to extract pieces of partial text from an input document 301 according to classification categories. That is, as shown in FIG. 4, from the same input document 301, the partial text extraction unit 130 attempts to extract pieces of partial text respectively for a classification category 1 and a classification category 2 based on predetermined extraction rules (a character count, a sentence count, a paragraph count, etc. to be described later). FIG. 4 shows that the partial text extraction unit 130 extracts pieces of partial text 11 and 12 for the classification category 1 and pieces of partial text 21, 22, and 23 for the classification category 2. That is, FIG. 4 shows that the keyword search conditions 161 are used as the sample document extraction conditions 160-1. The document matching unit 120 finds keyword hits for each classification category. In FIG. 4, keywords of the classification category 1 are denoted by filled circles, and keywords of the classification category 2 are denoted by open circles. The partial text extraction unit 130 extracts a portion around a keyword hit as a piece of partial text.

The number of classification categories is not especially limited, and may be set to any natural number of 1 or more. The sample document extraction conditions 160-1 for each classification category are set by the administrator 414 or the like.

Functions of components will be described below.

(Document Input Unit 110)

The document input unit 110 inputs, as a sample target document for learning, the input document 301 obtained by the network monitoring apparatus 300 through a transmission line. The sample target document is a target of partial text extraction.

(Document Matching Unit 120)

As described with reference to FIG. 4, using the sample document extraction conditions 160-1 (extraction conditions) set for each classification category, the document matching unit 120 performs a matching process on the input document 301 obtained by the document input unit 110. The sample document extraction conditions 160-1 are string matching conditions for searching for preset keywords. A search formula using a regular expression can be included in the sample document extraction conditions 160-1. Using a regular expression allows a more complex pattern to be searched in addition to a simple keyword, so that flexibility of the sample document extraction conditions 160-1 can be enhanced.

(Hit Position Acquisition Unit 121)

The document matching unit 120 includes a hit position acquisition unit 121 (position identification unit). The hit position acquisition unit 121 obtains information such as hit positions and hit counts obtained as a result of matching based on the sample document extraction conditions 160-1.

(Partial Text Extraction Unit 130)

The partial text extraction unit 130 extracts from the input document 301 a piece of partial text to be used as a learning sample for each classification category based on the result of matching by the document matching unit 120. "Partial text" refers to a document which is a part of the input document 301. "Partial text" is used to generate classification rules 150-1 for classifying a classification target document into one of a plurality of classification categories. As shown in FIG. 4, the same piece of partial text may be extracted for different classification categories (for example, partial text 11=partial text 21). There may also be a piece of partial text which is not used as a sample of any classification category. As an extreme example, the partial text extraction unit 130 may extract no piece of partial text from the input document 301 for a given classification category.

(Learning Unit 140)

The learning unit 140 receives from the partial text extraction unit 130 the piece of partial text extracted by the partial text extraction unit 130 from the input document 301 for each classification category, as a sample document of each classification category. Then, the learning unit 140 generates the classification rules 150-1 to be used in the classification unit 230. The term "generation" includes "updating" of the classification rules.

The learning unit 140 and the classification unit 230 may use a generally known document classification method using any machine learning. A document classification method using a plurality of machine learning may also be used, as disclosed in "Reference Document" shown below.
<Reference Document>WO2009/087757, "INFORMATION FILTERING SYSTEM, INFORMATION FILTERING METHOD, AND INFORMATION FILTERING PROGRAM"

(Classification Target Document Input Unit 210)

The classification target document input unit 210 inputs the input document 301 obtained by the network monitoring apparatus 300 through the transmission line, as a classification target document to be classified into one of the plurality of classification categories.

(Classification Target Document Division Unit 220)

The classification target document division unit 220 divides the input document 301 obtained by the classification target document input unit 210 into a plurality of documents of an appropriate size sequentially from the beginning of the document. For example, the classification target document division unit 220 divides the input document 301 to be classified according to an average size of pieces of partial text extracted by the partial text extraction unit 130.

(Classification Unit 230)

Using the classification rules 150-1, the classification unit 230 classifies a plurality of divided documents divided by the classification target document division unit 220 into classification categories. Alternatively, as shown in FIG. 2, the classification unit 230 may directly input the input document 301 input to the classification target document input unit 210, without using the classification target document division unit 220.

(Classification Result Determination Unit 240)

The classification result determination unit 240 integrates documents divided by the classification target document division unit 220 and classification results output by the classification unit 230, and outputs a classification result 302 for the input document 301.

(Description of Operations)

Operations of the document classification device 100 will now be described. Processes executed by the document classification device 100 are broadly divided into a learning process S100 and a classification process S200. Using the classification rules 150-1 generated by the learning process S100, the document classification device 100 performs the classification process S200 on the input document 301.

Figure 5:
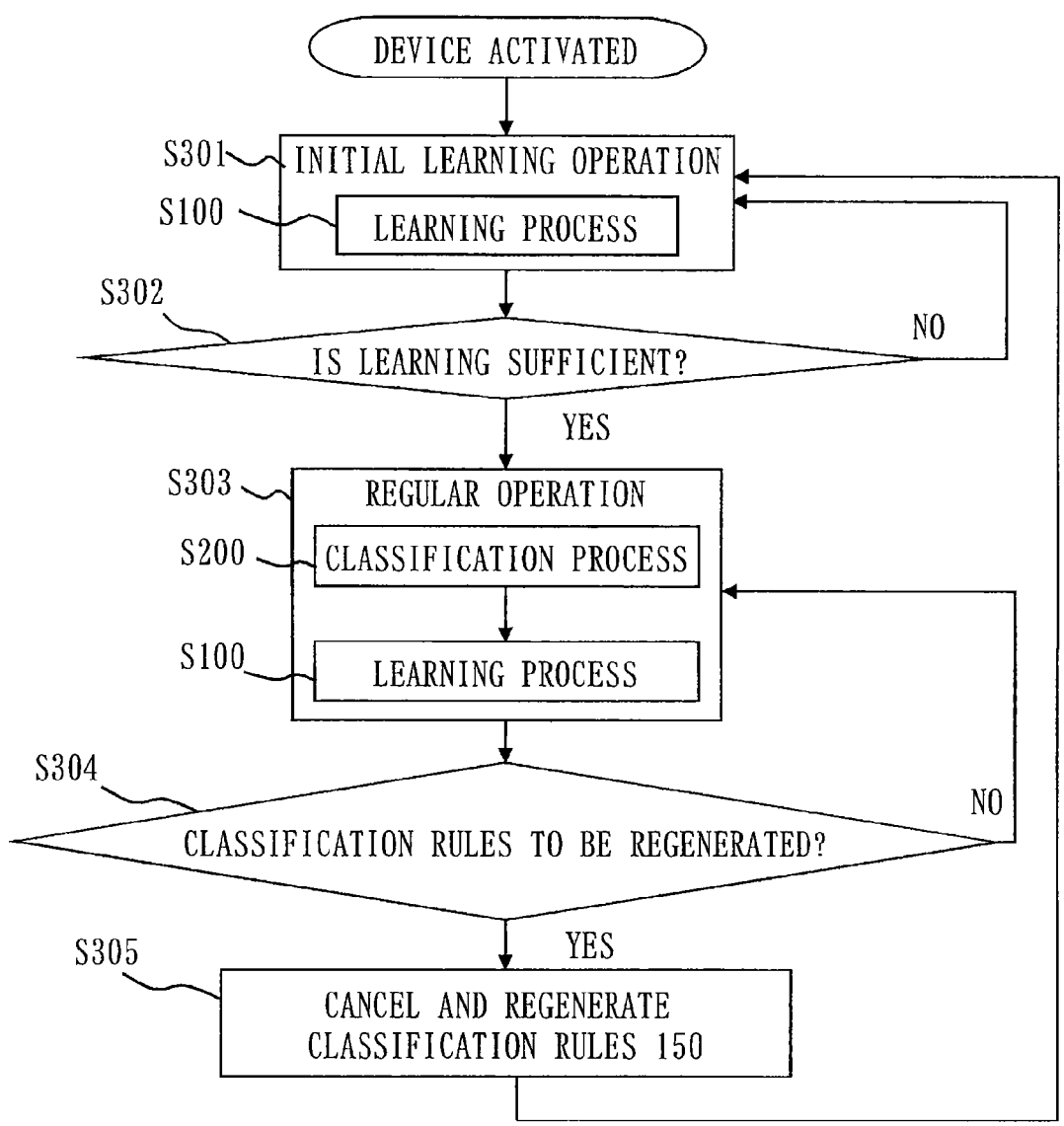
FIG. 5 is a flowchart showing an overview of operations of a document classification device 100 in the first embodiment.

FIG. 5 is a flowchart showing an overview of the operations of the document classification device 100. Referring to FIG. 5, an operational flow of the document classification device 100 will be described in terms of the learning process S100 and the classification process S200. The document classification device 100 may be adapted for any operational embodiment including processes of learning about sample documents and generating classification rules, not limited to the operational embodiment of FIG. 5. Immediately after the document classification device 100 is activated, the classification rules 150-1 have not been generated by the learning unit 140. Alternatively, even if the classification rules 150-1 have been generated, the amount of learning is insufficient. Therefore, immediately after the document classification device 100 is activated, only the learning process S100 is performed on the input document 301, and the classification process S200 is not performed. This operational mode is called an initial learning operation S301. During the initial learning operation S301, classification by machine learning using the classification rules 150-1 cannot be performed by the classification unit 230. However, a classification process using an alternative means is possible.

At S302, each time a new input document arrives, the learning unit 140 determines whether learning has been performed sufficiently using, for example, a method to be described later. If it is determined that learning is sufficient at S302, the learning unit 140 makes a transition from the initial learning operation S301 to a regular operation S303.

As a method for determining whether learning is sufficient at S302, there is a method using the number of documents learned by the learning process S100. When the number of documents learned reaches a number preset by the administrator 414 in all the classification categories, the learning unit 140 determines that learning is sufficient (S302), and determines that a transition can be made from S302 to the regular operation S303.

As another method for determining whether learning is sufficient at S302, there is a method using an operating time of the document classification device 100. When an operating time preset by the administrator 414, such as one week, is reached, the learning unit 140 determines that a transition can be made from S302 to the regular operation S303.

In the regular operation S303, the document classification device 100 performs the classification process S200 on the input document 301, and outputs the classification result 302. After the classification process S200, the document classification device 100 performs the learning process S100 on the same input document 301, and updates the classification rules 150-1.

At S304, the learning unit 140 determines whether to regenerate the classification rules 150-1 using, for example, a method to be described later. If the classification rules 150-1 are to be regenerated, S305 is taken and the learning unit 140 cancels the classification rules 150-1, and processing proceeds to the initial learning operation S301. If the classification rules 150-1 are not to be regenerated, the regular operation S303 is continued.

As a method for determining whether to regenerate the classification rules 150-1 at S304, there is a method using an operating time of the document classification device 100. When an operating time preset by the administrator 414, such as one year, is reached, the learning unit 140 determines to cancel the classification rules 150-1 at S304 (S305).

Figure 6:
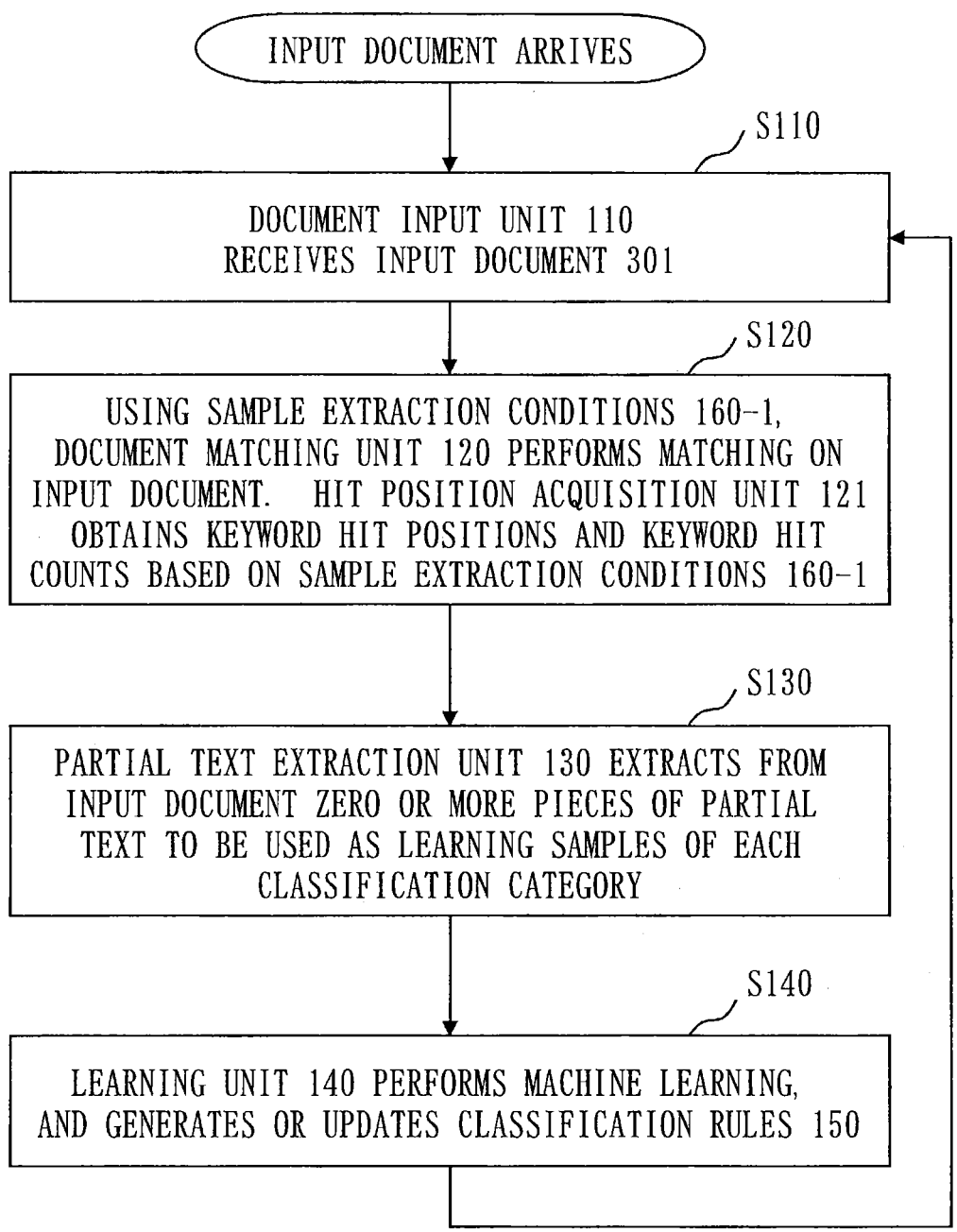
FIG. 6 is a flowchart showing detailed operations of a learning process S100 of the document classification device 100 in the first embodiment.

FIG. 6 is a flowchart showing detailed operations of the learning process S100 in the document classification device 100. Referring to FIG. 6, the detailed operations of the learning process S100 in the document classification device 100 will now be described.

Figure 7:
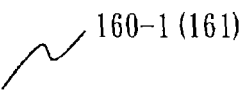
FIG. 7 is a diagram showing keyword search conditions 161 in the first embodiment.

FIG. 7 is a diagram showing that the keyword search conditions 161 are used as the sample document extraction conditions 160-1. As shown in FIG. 7, the sample document extraction conditions 160-1 for each classification category are composed of at least one appropriate keyword that falls under that classification category. For example, with regard to a classification category 1 in FIG. 7, keywords 1-1, 1-2, ..., 1-i are keywords appropriate for the classification category 1 (appropriate keywords).

(1) When a new document arrives at the network monitoring apparatus 300, the document input unit 110 receives the new document as the input document 301 (S110).

(2) Using the sample document extraction conditions 160-1 set for each classification category, the document matching unit 120 matches the input document 301 against the sample document extraction conditions 160-1 (S120). During matching, the hit position acquisition unit 121 obtains hit positions and hit counts of the keywords set as the sample document extraction conditions 160-1 for each classification category.

(3) Based on information such as the hit positions and hit counts of the keywords obtained as a result of the matching process S120 of the hit position acquisition unit 121, the partial text extraction unit 130 extracts from the input document 301 zero or more pieces of partial text to be used as learning samples for each classification category (S130). That is, based on the result of matching by the document matching unit 120, the partial text extraction unit 130 attempts to perform partial text extraction to extract pieces of partial text from the input document 301 for each classification category.

(4) If a piece of partial text corresponding to one of the classification categories is extracted by the extraction process S130 of the partial text extraction unit 130, the learning unit 140 performs predetermined machine learning using the extracted piece of partial text as a sample document, and thereby generates (updates) the classification rules 150-1 (S140).

(Use of Keywords)

As the sample document extraction conditions 160-1 to be used in the matching process S120, the keyword search conditions 161 in which a plurality of keywords are specified for each classification category can be used, as shown in FIG. 7. In the keyword search conditions 161, keywords relevant to each classification category (appropriate keywords) are specified. In this case, at S130, the partial text extraction unit 130 extracts a portion around a hit position obtained based on the keyword search conditions 161 as a piece of partial text for the corresponding classification category (a specific extraction method will be described later). With this arrangement, it is possible to extract as sample documents only pieces of partial text relevant to the corresponding classification category.

(Methods for Partial Text Extraction)

(1) As a method for extracting a piece of text around a hit position based on the keyword search conditions 161 as a piece of partial text, there is a method using a character count. The partial text extraction unit 130 uses each hit position as a base point, and extracts text of a predetermined number of characters respectively before and after the hit position as a piece of partial text.

(2) As another method for extracting a piece of text around a hit position based on the keyword search conditions 161 as a piece of partial text, there is a method using a sentence count. The partial text extraction unit 130 uses a sentence including each hit position as a base point, and extracts a predetermined number of sentences respectively before and after the hit position as a piece of partial text. As means for counting the number of sentences, for the Japanese language for example, there is a method of counting the number of periods. Substantially the same method can be applied to other languages.

(3) As yet another method for extracting a piece of text around a hit position based on the keyword search conditions 161 as a piece of partial text, there is a method using paragraphs. The partial text extraction unit 130 extracts a paragraph including each hit position as a piece of partial text. For example, in a document in a format including embedded tags such as an HTML document, a paragraph can be easily taken out using tag information. It is also possible to use a paragraph including each hit position as a base point and extract a predetermined number of paragraphs respectively before and after the hit position as a piece of partial text.

(Integration of Pieces of Partial Text)

Pieces of partial text extracted by the partial text extraction unit 130 based on the keyword search conditions 161 may have a common portion. It is likely the case that keywords relevant to a given classification category appear clustered around a given location in a document. Therefore, if a plurality of pieces of partial text having a common portion are extracted as individual pieces of partial text, this is likely to result in learning of several similar sample documents. Accordingly, if a plurality of extracted pieces of partial text have a common portion, the partial text extraction unit 130 integrates these pieces of partial text into one piece of partial text. In this way, the learning unit 140 can be prevented from learning about several similar sample documents.

Figure 8:
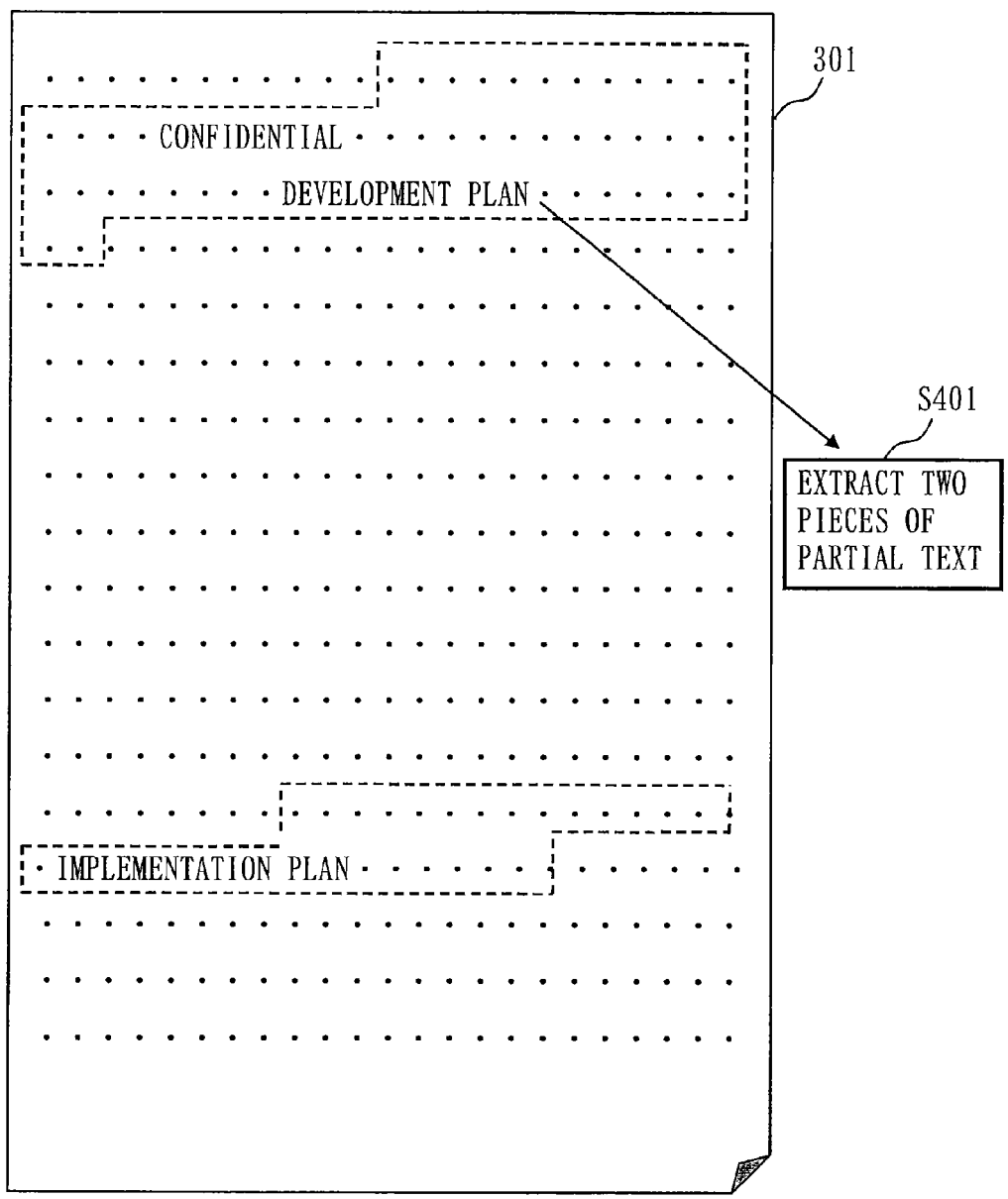
FIG. 8 is a diagram showing integration of two pieces of partial text into one piece in the first embodiment.

FIG. 8 is a diagram showing that two pieces of partial text are integrated into one piece. FIG. 8 shows how partial text extraction is performed when keywords "confidential", "development plan", and "implementation plan" are specified as the keyword search conditions 161. FIG. 8 represents how partial text extraction is performed using the character count. FIG. 8 shows a result of integrating two pieces of partial text into one and extracting the two pieces as one piece of partial text, since a piece of partial text around a hit position of "confidential" is partially overlapped with a piece of partial text around a hit position of "development plan" (S401).

(Keyword Hit Count)

If a keyword hit count based on the keyword search conditions 161 in a given classification category is less than a predetermined count, the partial text extraction unit 130 may exclude the input document 301 entirely from the target of partial text extraction for that classification category. If the hit count is small, it is likely that the input document 301 has a low relevance to that classification category. Thus, providing a threshold based on the hit count allows the learning unit 140 to avoid excessive learning.

(Type IDs of Appropriate Keywords)

FIG. 9 is a diagram showing type IDs that can be set for keywords. For each keyword specified in the keyword search conditions 161, a type ID (an example of type information) according to a keyword type can be added. For example, assume that classification categories related to confidential information are set for preventing information leakage. As shown in FIG. 9, assume that "confidential" and "system development plan" are set as keywords. It may be arranged that a type ID associated with a confidential level such as "confidential" is set as "1", and a type ID of a keyword related to a confidential document name such as "system development plan" is set as "2". The same type ID may be set for different keywords. For example, the type ID "1" may be set for all of a plurality of important keywords.

(Type ID Hit Count)

At this time, when a hit count of a predetermined type ID based on the keyword search conditions 161 in a given classification category is less than a predetermined count, the partial text extraction unit 130 may exclude the input document 301 entirely from the target of partial text extraction for that classification category. For example, this applies when the type ID "1" is set for a plurality of important keywords and the hit count of the type ID "1" is less than a predetermined count. When the hit count of a predetermined type ID is small, it is likely that the input document 301 has a low relevance to that classification category. Thus, providing a threshold for the type ID hit count allows the learning unit 140 to avoid excessive learning.

(Importance Levels of Type IDs)

Depending on the type ID of a keyword for which a hit is found based on the keyword search conditions 161, the partial text extraction unit 130 may change the size of partial text to be extracted from around a hit position of the keyword. The partial text extraction unit 130 may be configured to extract a large piece of partial text for a type ID corresponding to an important keyword. With this arrangement, pieces of partial text can be extracted predominantly from around important keywords.

(Method For Determining Importance Levels of Type IDs)

As a method for determining an importance level of a keyword, there is a method using a keyword length. For example, when classification categories associated with confidential information are considered, "system development plan" is a more specific keyword than "plan", and it is likely that confidential information is written around "system development plan". On the other hand, "plan" is a more general term and is likely to appear also in unintended documents. This is an example of a direct correlation between keyword lengths and importance levels of keywords. Accordingly, type IDs are set such that a large size of partial text is extracted for a long keyword. In this case, it is necessary to define the type ID of a keyword according to the length of the keyword. For example, the smallest type ID number is given the highest importance level. Type IDs of single-digit numbers are set for long keywords (important keywords), and type IDs of other than single-digit numbers are set for short keywords. The text extraction unit 130 increases the size of partial text to be extracted in proportion to the smallness of the type ID number.

(Hit of a Specific Type ID)

When type IDs are defined in the keyword search conditions 161, the partial text extraction unit 130 may use the input document 301 as the target of partial text extraction only when the input document 301 includes a hit for a keyword having a specific type ID (for example, the type ID "1"). Conversely stated, when no hit is found for a keyword having a specific type ID, the partial text extraction unit 130 does not use the input document 301 as the target of partial text extraction. There may be a plurality of such type IDs. In this case, the input document 301 is used as the target of partial text extraction only when hits are found for keywords corresponding to all of the specified type IDs.

(Concentration of Keyword Hit Positions)

When hit positions based on the keyword search conditions 161 appear concentrated at a given location in the input document 301, it is likely that contents that are relevant to a corresponding classification category are written at that location. Conversely, when hit positions are not concentrated, it is likely that those keywords are written at respective positions by chance. Accordingly, only a portion where a hit count within a specified number of characters is equal to or more than a predetermined count is set as the target of partial text extraction. Specifically, a text size to be a piece of partial text is specified first. When a keyword hit count within this size is equal to or more than a specified count, this text size is extracted as a piece of partial text. A range to be a piece of partial text cannot be determined only by the text size, so that determination rules are separately specified. For example, a possible determination rule may be to determine the range of a piece of partial text based on the first keyword hit of a plurality of keyword hits.

(Keyword Exclusion Conditions 162)

As the sample document extraction conditions 160-1 to be used in the matching process S120, the keyword exclusion conditions 162 in which a plurality of keywords (inappropriate keywords) are specified may be used. In the keyword exclusion conditions 162, inappropriate keywords not suitable for each classification category are specified. For each classification category, at least either of the keyword search conditions 161 and the keyword exclusion conditions 162 may be set. In this case, in the extraction process S130, the partial text extraction unit 130 excludes a portion around a hit position of an inappropriate keyword obtained based on the keyword exclusion conditions 162 from the target of partial text extraction for the corresponding classification category, and extracts a piece of partial text to be used as a sample document from the remaining portion. With this arrangement, pieces of partial text that are likely to be not appropriate for the corresponding classification category can be excluded from sample documents. As a result, only pieces of partial text that are relevant to the classification category can be extracted.

FIG. 10 shows an example of setting the keyword search conditions 161 and the keyword exclusion conditions 162 respectively in a "positive category" and a "negative category". In particular, as shown in FIG. 10, in the case of binary classification with two classification categories, the classification categories are often defined as a category of documents that are relevant to a given topic (positive category) and a category of other documents (negative category). In this case, it is generally difficult to set keywords (appropriate keywords) that are relevant to the "negative category". Accordingly, in the "negative category", keywords that are relevant to the positive category are set as inappropriate keywords of the keyword exclusion conditions 162, as shown in FIG. 10. With this arrangement, in partial text extraction for the negative category, documents including keywords having a low relevance to the negative category can be excluded from samples. That is, in the "positive category", the keyword search conditions 161 composed of appropriate keywords are set. In the "negative category", the keyword exclusion conditions 162 are set such that the keywords of the "positive category" are specified as inappropriate keywords.

In this case, the keyword exclusion conditions 162 associated with the "negative category" may be the same as or different from the keyword search conditions 161 associated with the positive category. As a specific example of setting different conditions, all the keywords set in the keyword search conditions 161 associated with the positive category are included in the keyword exclusion conditions 162 associated with the "negative category" and more keywords are additionally set. By setting a larger number of keywords in the keyword exclusion conditions 162, the probability of avoiding excessive learning by the learning unit 140 can be enhanced.

As methods for excluding a piece of text around a hit position of the keyword exclusion conditions 162 from the target of partial text extraction, there are methods using a character count, a sentence count, and paragraphs. These respectively correspond to the methods for partial text extraction based on the keyword search conditions 161.

(Inappropriate Keyword Hit Count)

When a hit count based on the keyword exclusion conditions 162 in a given classification category is equal to or more than a predetermined count (equal to or more than a set value), the input document 301 can be entirely excluded from the target of partial text extraction in that classification category. That is, in this case, the partial text extraction unit 130 extracts no piece of partial text from the input document 301 for that classification category. When the hit count is high, it is likely that the input document 301 has a low relevance to that classification category. Thus, by providing a threshold based on the hit count, excessive learning can be avoided.

(Type IDs of Inappropriate Keywords)

For each keyword specified in the keyword exclusion conditions 162, a type ID (identification information) can be defined, as in the case of the keyword search conditions 161. The same type ID may be set for different inappropriate keywords, as in the case of appropriate keywords. At this time, when a hit count of a predetermined type ID based on the keyword exclusion conditions 162 in a given classification category is equal to or more than a predetermined count (equal to or more than a set value), the input document 301 can be entirely excluded from the target of partial text extraction in that classification category. When the hit count of the type ID is high, it is likely that the input document 301 has a low relevance to that classification category. Thus, by providing a threshold based on the type ID hit count, excessive learning can be avoided.

(Type IDs and Exclusion Range Sizes)

Depending on the type ID of a keyword for which a hit is found based on the keyword exclusion conditions 162, a "size of partial text to be excluded around the corresponding hit position" (exclusion range size) can be changed. This corresponds to changing the size of partial text to be extracted using a type ID of the keyword search conditions 161.

(Type IDs and Input Document 301)

When type IDs are set in the keyword exclusion conditions 162, the input document 301 can be used as the target of partial text extraction only when the input document 301 includes no hit for a keyword having a predetermined type ID. There may be a plurality of such type IDs. In this case, the input document 301 is used as the target of partial text extraction only when no hits are found for keywords corresponding to all of the specified type IDs.

(Partial Text Extraction Based on Inappropriate Keywords)

Figure 11:
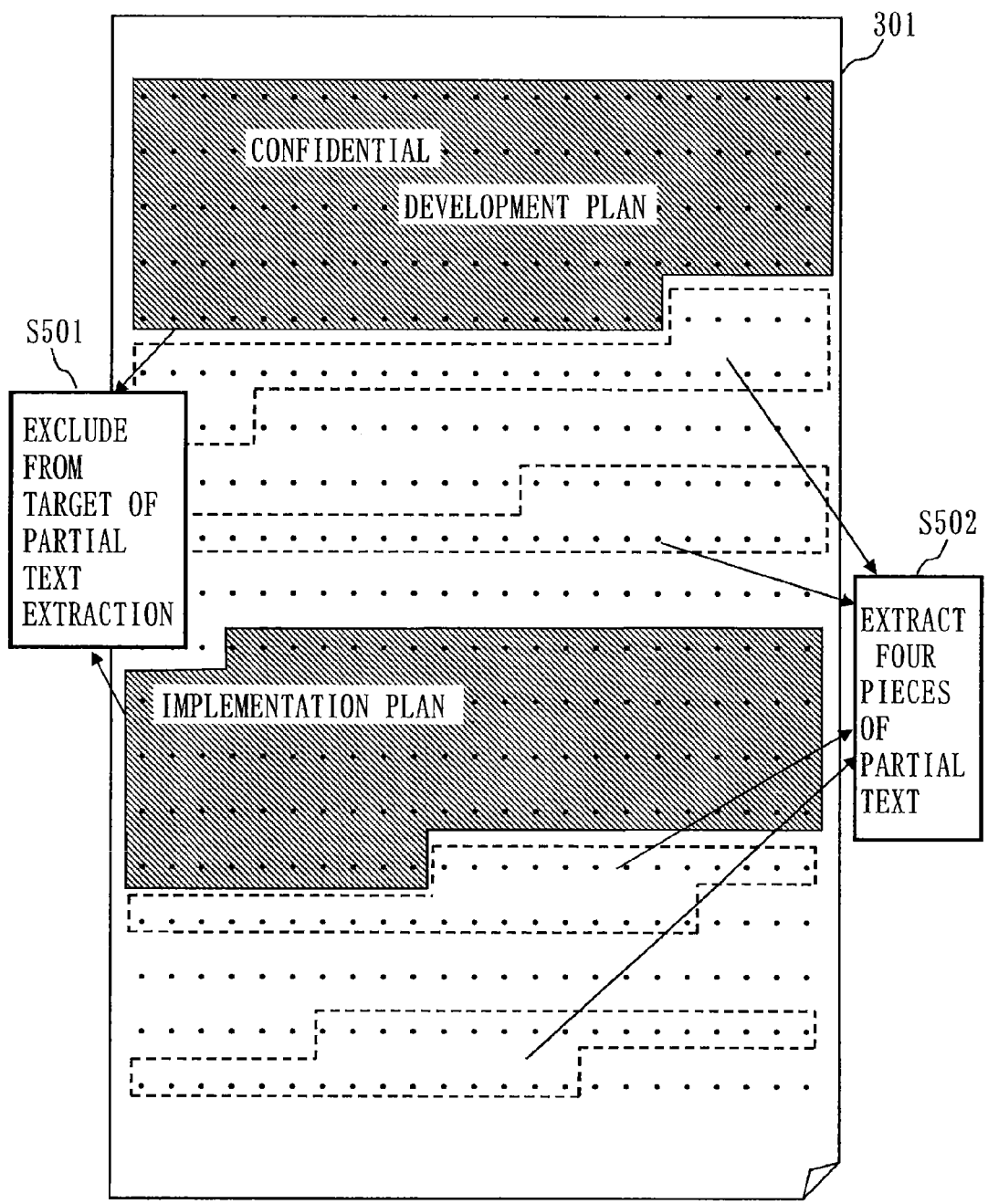
FIG. 11 is a diagram describing a case in which only the keyword exclusion conditions 162 are set for a given classification category in the first embodiment.

FIG. 11 is a diagram showing the extraction process S130 when only the keyword exclusion conditions 162 are set in a given classification category. Assume that only the keyword exclusion conditions 162 are set in the given classification category as the sample document extraction conditions 160-1 to be used in the matching process S120 by the document matching unit 120. There is a need for a means of extracting a piece of partial text to be used as a sample document from the remaining portion after exclusion based on the keyword exclusion conditions 162. An example of this means will be described using FIG. 11. In FIG. 11, inappropriate keywords of "confidential", "development plan", and "implementation plan" are specified as the keyword exclusion conditions 162. First, the partial text extraction unit 130 excludes pieces of text around the specified inappropriate keywords from the target of partial text extraction (S501). Then, starting from the beginning of the remaining text, the partial text extraction unit 130 extracts a predetermined size of partial text or skips the predetermined size of partial text and repeats this process until the end of the document (S502). In this way, the partial text extraction unit 130 can avoid extracting pieces of text around inappropriate keyword hits based on the keyword exclusion conditions 162 as sample documents, and extract pieces of partial text from the remaining portion.

(Use of Both the Keyword Search Conditions 161 and the Keyword Exclusion Conditions 162)

As the sample document extraction conditions 160-1 to be used in the matching process S120 in a given classification category, both the keyword search conditions 161 and the keyword exclusion conditions 162 may be set. In this case, the partial text extraction unit 130 excludes pieces of text based on the keyword exclusion conditions 162, and then extracts pieces of partial text from the remaining portion (area) including only the appropriate keywords of the keyword search conditions 161.

Setting both the keyword search conditions 161 and the keyword exclusion conditions 162 may be effective when there is a common keyword that is relevant to different classification categories.

Figure 12:
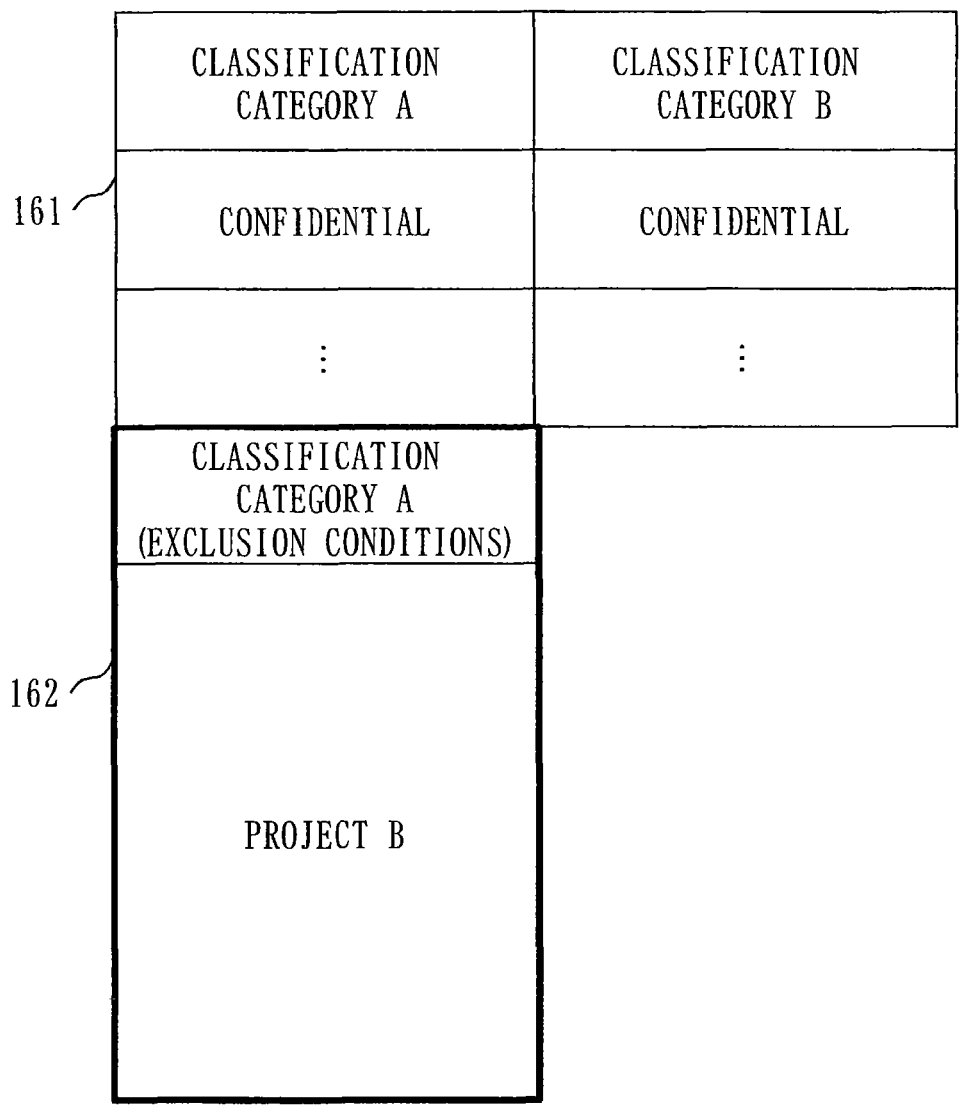
FIG. 12 is a diagram describing use of both the keyword search conditions 161 and the keyword exclusion conditions 162 in the first embodiment.

FIG. 12 is a diagram showing use of both the keyword search conditions 161 and the keyword exclusion conditions 162. For example, as shown in FIG. 12, a classification category including confidential information associated with a project A (classification category A) and a classification category including confidential information associated with a project B (classification category B) are defined as separate classification categories. In this case, setting a keyword "confidential" in the keyword search conditions 161 for both of the classification categories is considered effective. However, the project A and the project B cannot be distinguished only with the keyword "confidential". For this reason, a keyword "project B" is set in the keyword exclusion conditions 162 for the classification category A.

With this arrangement, it is possible to avoid extracting a piece of partial text relevant to the classification category B as a sample for the classification category A.

(Use of Both and Type IDs)

The keyword search conditions 161 and the keyword exclusion conditions 162 may be both set, and type IDs may be defined in both of these conditions. In this case, the partial text extraction unit 130 may use the input document 301 as the target of partial text extraction for that classification category only when the input document 301 includes a hit for a keyword having a predetermined type ID in the keyword search conditions 161 and no hit for a keyword having a predetermined type ID in the keyword exclusion conditions 162. There may be a plurality of such type IDs. In this case, the partial text extraction unit 130 uses the input document 301 as the target of partial text extraction for the classification category when the input document 301 includes hits for keywords corresponding to all of the type IDs set in the keyword search conditions 161 and no hits for keywords corresponding to all of the type IDs set in the keyword exclusion conditions 162.

(When the Input Document 301 is an Electronic Mail Message)

When the input document 301 is an electronic mail message, the mail address search conditions 163 for searching for specified mail addresses included in an electronic mail header may be used as the sample document extraction conditions 160-1 to be used in the matching process S120 by the document matching unit 120. The mail address search conditions 163 are used in combination with the keyword search conditions 161 and/or the keyword exclusion conditions 162. Specifically, depending on a result of matching based on the mail address search conditions 163, the partial text extraction unit 130 can change the size of partial text to be extracted or excluded based on the keyword search conditions 161 or the keyword exclusion conditions 162, and change a threshold setting based on the hit count. In this way, the document matching unit 120 matches the input document 301 against mail addresses using the mail address search conditions 163 (extraction conditions). Depending on a result of matching by the document matching unit 120 using mail addresses, the partial text extraction unit 130 controls partial text extraction, such as changing the size of partial text, and so on.

For example, when a destination organization of electronic mail is set as a classification category, mail address information written in an electronic mail header provides a strong hit for determining a classification category to which an electronic mail message is relevant. If a low relevance to the target classification category is determined based on the mail address information, it is appropriate for the partial text extraction unit 130 to reduce the number and/or size of partial text to be extracted from that electronic mail message. Conversely, if a high relevance to the target classification category is determined based on the mail address information, it is appropriate for the partial text extraction unit 130 to increase the number and/or size of partial text to be extracted from that electronic mail message. In this way, by using the mail address search conditions 163, the mail address information can be used as a weight in partial text extraction.

(When the Input Document 301 is a Web Page)

When the input document 301 is a Web page, the URL search conditions 164 for searching for URLs (Uniform Resource Locators) may be used as the sample document extraction conditions 160-1 to be used in the matching process S120 by the document matching unit 120. The URL search conditions 164 are used in combination with the keyword search conditions 161 and/or the keyword exclusion conditions 162. Specifically, depending a result of matching based on the URL search conditions 164, the partial text extraction unit 130 can change the size of partial text to be extracted or excluded based on the keyword search conditions 161 or the keyword exclusion conditions 162, and change a threshold setting for the hit count. In this way, the document matching unit 120 matches the input document 301 against URLs using the URL search conditions 164 (extraction conditions). Depending on a result of matching using URLs by the document matching unit 120, the partial text extraction unit 130 controls partial text extraction, such as changing the size of partial text, and so on.

For example, when it is considered that a Web page whose URL domain includes "go.jp" contains high-value information, the partial text extraction unit 130 can increase the number and/or size of partial text to be extracted from a Web page determined by the document matching unit 120 as including "go.jp" in the URL domain based on the URL search conditions 164. In this way, by using the URL search conditions 164, URL information can be used as a weight in partial text extraction.

Figure 13:
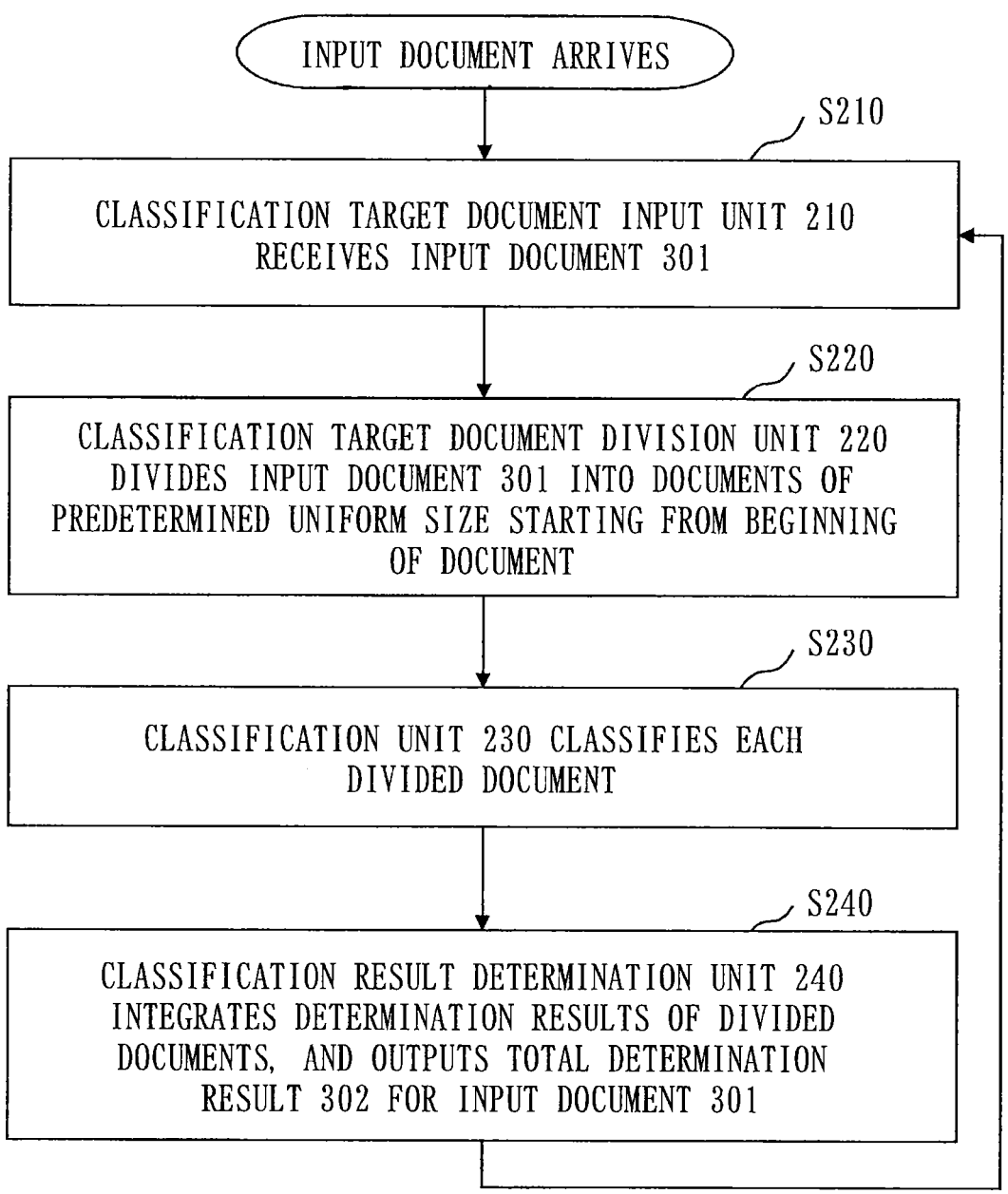
FIG. 13 is a flowchart showing detailed operations of a classification process S200 in the first embodiment.

FIG. 13 is a flowchart showing detailed operations of the classification process S200. Referring to FIG. 13, the operations of the classification process S200 in the document classification device 100 will now be described.

(1) The classification target document input unit 210 receives a new document as the input document 301 (S210).

(2) The classification target document division unit 220 divides the input document 301 into documents of a predetermined uniform size starting from the beginning (S220).

(3) The classification unit 230 performs a classification process using the classification rules 150-1 on each document divided in the process S220 (S230).

(4) The classification result determination unit 240 integrates determination results of the respective divided documents output by S230, and outputs the classification result 302 as a total determination result for the input document 301 (S204).

As in the case of a sample target document, a classification target document may also contain a plurality of topics within a single document. In the division process S220, the classification target document division unit 220 divides the input document 301 from the beginning into documents of the predetermined uniform size, thereby increasing the probability of dividing the plurality of topics as separate documents. As a result, the probability of correct detection of the plurality of topics can be enhanced. For example, the classification target document division unit 220 may divide the classification target document according to an average size of pieces of partial text extracted by the partial text extraction unit 130.

The classification rules 150-1 stored in the classification rule storage unit 150 are obtained by learning of sample documents obtained through partial text extraction from sample target documents. Thus, the process S220 also assumes a role of matching a size of sample documents to be input to a machine learning algorithm and a size of classification target documents.

As a method for determining the classification result 302 for the input document 301 in the determination process S240, there is a method using a majority decision. In this method, a classification category that is determined most frequently is determined as the classification result 302, among the determination results of the divided documents output in the classification process S230.

As another method for determining the classification result 302, there is a method by which if a determination result for at least one divided document indicates a given category, this classification category is included in the classification result 302. In this method, the classification result 302 may include a plurality of classification categories.

For example, assume that the input document 301 is an electronic mail message, and electronic mail destination organizations are set as classification categories. Since there are generally a plurality of electronic mail destinations, the electronic mail message may belong to a plurality of classification categories. In this case, it is natural that the classification result 302 includes a plurality of classification categories.

As described above, in the document classification device 100 of the first embodiment, the document matching unit 120 performs matching on the input document 301 (sample target document) that is input based on the sample document extraction conditions 160-1 that are preset for each classification category. Then, based on information such as hit positions and hit counts, the partial text extraction unit 130 extracts from the input document 301 pieces of partial texts to be used as sample documents. These processes allow only appropriate topics to be extracted as samples even from an input document including a plurality of topics. The size of a sample document (partial text) can be restricted, so that the capability of the learning process by the learning unit 140 can be enhanced. As a result, according to the document classification device 100, learning samples not including unnecessary information can be automatically collected without human effort. Thus, it is possible to provide a document classification device that can easily generate classification rules and classify a classification target document into an appropriate category with high precision.

Second Embodiment

Figure 14:
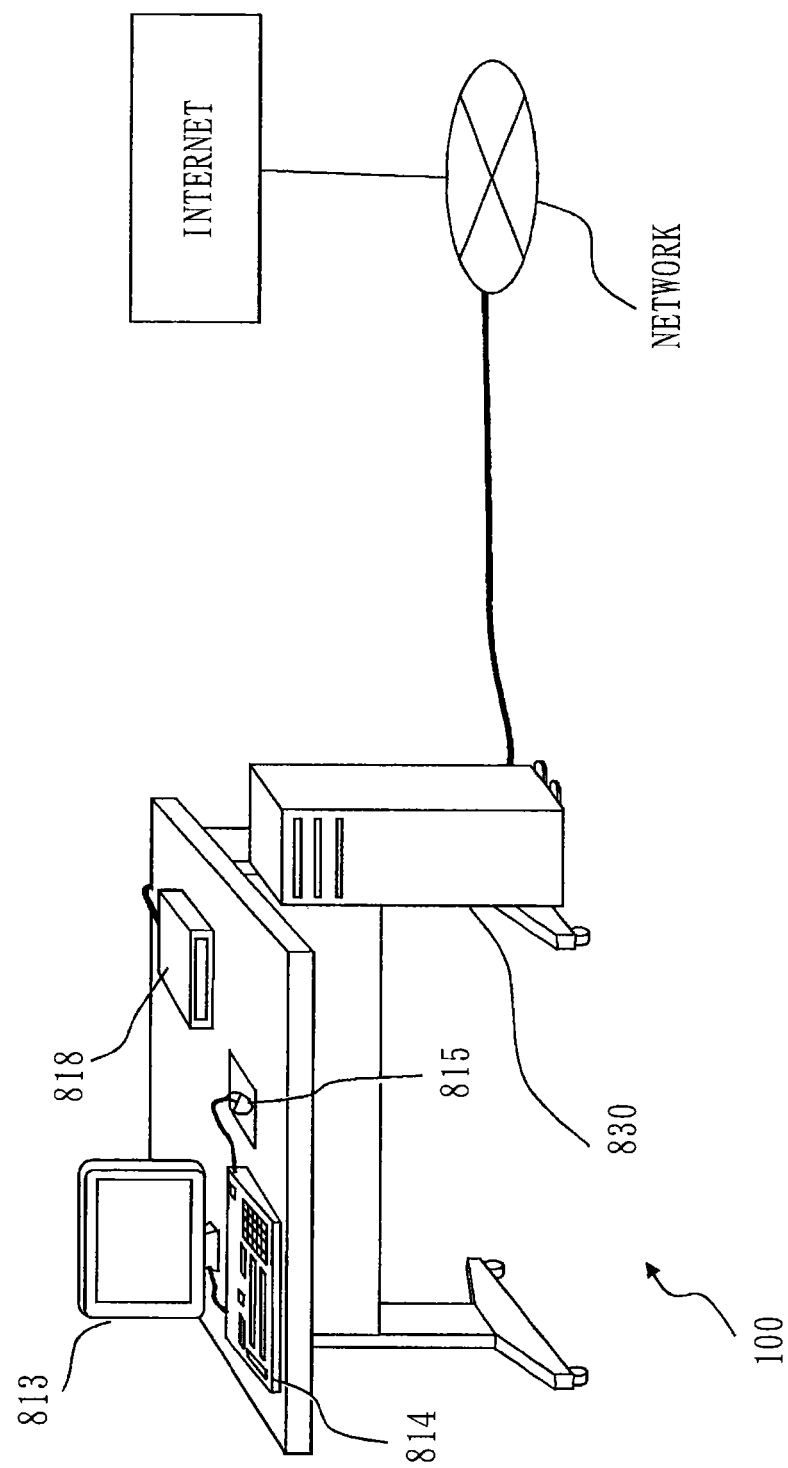
FIG. 14 is a diagram showing an example of appearance of the document classification device 100 in the first embodiment.
Figure 15:
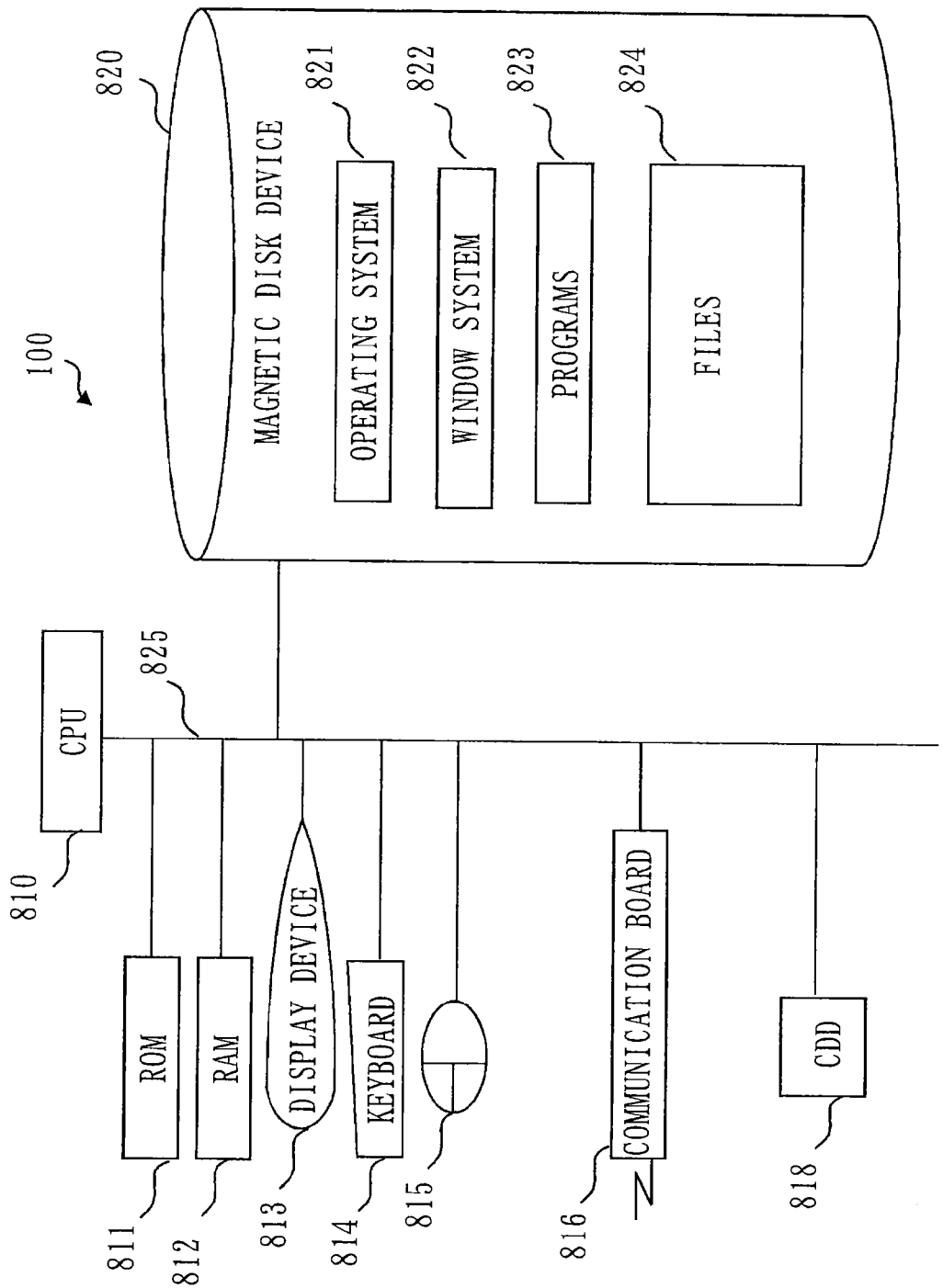
FIG. 15 is a diagram showing a hardware configuration of the document classification device 100 in the first embodiment.

Referring to FIGS. 14 and 15, a second embodiment will be described. In the second embodiment, a hardware configuration of the document classification device 100 (classification rule generation device) which is a computer will be described.

FIG. 14 is a diagram showing an example of appearance of the document classification device 100. FIG. 15 is a diagram showing an example of hardware resources of the document classification device 100.

In FIG. 14 showing the appearance, the document classification device 100 includes hardware resources such as a system unit 830, a display device 813 having a display screen such as a CRT (cathode ray tube) or an LCD (liquid crystal), a keyboard 814 (K/B), a mouse 815, and a compact disk drive 818 (CDD). These are connected through cables or signal lines. The system unit 830 is connected with a network. The network is further connected with the Internet.

In FIG. 15 showing the hardware resources, the document classification device 100 includes a CPU 810 (Central Processing Unit) that executes programs. The CPU 810 is connected through a but 825 with a ROM (Read Only Memory) 811, a RAM (Random Access Memory) 812, the display device 813, the keyboard 814, the mouse 815, the communication board 816, the CDD 818, and a magnetic disk device 820. The CPU 810 controls these hardware devices. The magnetic disk device 820 may be replaced by a storage device such as an optical disk device or a flash memory.

The RAM 812 is an example of a volatile memory. Storage media such as the ROM 811, the CDD 818, and the magnetic disk device 820 are examples of a non-volatile memory. These are examples of a "memory device", a memory unit, a storage unit, or a buffer. The communication board 816, the keyboard 814, and so on are examples of an input unit or an input device. The communication board 816, the display device 813, and so on are examples of an output unit or an output device. The communication board 816 is connected with the network.

The magnetic disk device 820 stores an operating system 821 (OS), a window system 822, programs 823, and files 824. The programs 823 are executed by the CPU 810, the operating system 821, or the window system 822.

The programs 823 store programs for executing functions described as ". . . unit" in the above embodiment. The programs are read and executed by the CPU 810.

The files 824 store, as items of ". . . file" or ". . . database", information described as the sample document extraction conditions 160-1 and the classification rules 150-1 and information described as "a result of determination of . . . ", "a result of calculation of . . . ", "a result of extraction of . . . ", "a result of generation of . . . ", and "a result of processing o f . . . " in the above embodiment, as well as data, signal values, variable values, parameters, and so on. The ". . . file" and ". . . database" are stored in a recording medium such as a disk or a memory. The information, data, signal values, variable values, and parameters stored in the storage medium such as the disk or the memory are read by the CPU 810 to a main memory or a cache memory through a read/write circuit, and are used in operations of the CPU, such as extraction, search, reference, comparison, calculation, computation, processing, output, printing, and display. During the operations of the CPU, such as extraction, search, reference, comparison, calculation, computation, processing, output, printing, and display, the information, data, signal values, variable values, and parameters are temporarily stored in the main memory, the cache memory, or a buffer memory.

In the description of the embodiment above, data and signal values are stored in storage media such as a memory of the RAM 812, a compact disk of the CDD 818, a magnetic disk of the magnetic disk device 820, an optical disk, a mini disk, a DVD (Digital Versatile Disk), and so on. The data and signal values are transmitted online through the bus 825, a signal line, a cable or other types of transmission medium.

In the description of the embodiment above, what is described as ". . . unit" may be ". . . means" and may also be ". . . step", ". . . procedure", or ". . . process". That is, what is described as ". . . unit" may be implemented by software, or a combination of software and hardware, or a combination further including firmware. Firmware and software are stored as programs in recording media such as a magnetic disk, a flexible disk, an optical disk, a compact disk, a mini disk, and a DVD. The programs are read by the CPU 810 and are executed by the CPU 810. That is, the programs cause a computer to function as ". . . unit" described above, or cause a computer to execute procedures or methods of ". . . unit" described above.

In the above embodiment, the document classification device 100 (classification rule generation device) has been described. The operations of the components of the document classification device 100 may be understood as a classification rule generation method. Alternatively, the operations of the components of the document classification device 100 may be understood as a classification rule generation program. The classification rule generation program is stored in a computer-readable recording medium.

In the above embodiment, the following document classification device has been described.

The document classification device is configured to classify an input document into a plurality of classification categories, and includes (1) the document input unit that inputs a plurality of sample documents, (2) the document matching unit that performs matching on each of the input sample documents based on sample document extraction conditions that are preset for each classification category, (3) the partial text extraction unit that extracts from each of the sample documents zero or more pieces of partial text to be used for learning, based on a result of matching by the document matching unit, and (4) the learning unit that performs machine learning by at least one algorithm using pieces of partial text extracted for each classification category, so as to generate or update classification rules.

In the above embodiment, the following document classification device has been described.

The document classification device further includes (5) the classification document input unit that inputs one or more classification target documents, (6) the classification target document division unit that divides each of the input classification target documents sequentially from the beginning of the document in accordance with an average size of pieces of partial text used for learning, (7) the classification unit that classifies respective divided documents into a plurality of classification categories by at least one algorithm using classification rules corresponding to the algorithm, and (8) the classification result determination unit that integrates classification results of the respective divided documents, and determines a total classification result for the classification target document.

In the above embodiment, the document classification device has been described, wherein the sample document extraction conditions include keyword search conditions in which a plurality of keywords are specified for each classification category, wherein the hit position acquisition unit of the document matching unit obtains from a sample target document a hit position and a hit count of a string based on the keyword search conditions for each classification category, and wherein the partial text extraction unit 130 extracts a piece of partial text around the hit position based on the keyword search conditions.

In the above embodiment, the document classification device has been described, wherein the partial text extraction unit extracts no piece of partial text when the hit count based on the keyword search conditions is less than a predetermined count.

In the above embodiment, the document classification device has been described, wherein a type number is set for each of the keywords specified in the keyword search conditions, wherein the document matching unit 120 can identify a keyword type based on a type ID, and wherein the partial text extraction unit changes the size of partial text to be extracted, depending on the type of a keyword for which a hit is found based on the keyword search conditions.

In the above embodiment, the document classification device has been described, wherein the partial text extraction unit extracts no piece of partial text when a keyword type (type ID) hit count based on the keyword search conditions is less than a predetermined count.

In the above embodiment, the document classification device has been described, wherein the partial text extraction unit uses as the target of partial text extraction only a portion where a keyword hit count based on the keyword search conditions within a specified range is equal to or more than a predetermined count.

In the above embodiment, the document classification device has been described, wherein each of the keywords specified in the keyword search conditions has a type number (type ID), and a minimum type set composed of type numbers in the keyword search conditions is predetermined for each classification category, wherein the document matching unit 120 can identify the type of each keyword based on the type number, and wherein the partial text extraction unit extracts no piece of partial text when a combination of keyword types for which hits are found based on the keyword search conditions does not include the minimum type set.

In the above embodiment, the document classification device has been described, wherein the sample document extraction conditions for each classification category include keyword exclusion conditions in which a plurality of keywords are specified, wherein the hit position acquisition unit obtains from the sample target documents a hit position and a hit count of a string based on the keyword exclusion conditions for each classification category, based on matching by the document matching unit 120, and wherein the partial text extraction unit excludes from the target of extraction a piece of partial text around the hit position based on the keyword exclusion conditions, and extracts zero or more pieces of partial text from the remaining portion.

In the above embodiment, the document classification device has been described, wherein the partial text extraction unit extracts no piece of partial text when the hit count based on the keyword exclusion conditions is equal to or more than a predetermined count.

In the above embodiment, the document classification device has been described, wherein each of the keywords specified in the keyword exclusion conditions has a type number (type ID), and the document matching unit 120 can identify the type of each keyword based on the type number, and wherein the partial text extraction unit changes the size of partial text to be excluded from the target of extraction, according to the type of a keyword for which a hit is found based on the keyword exclusion conditions.

In the above embodiment, the document classification device has been described, wherein the partial text extraction unit extracts no piece of partial text when a keyword type hit count based on the keyword exclusion conditions is equal to or more than a predetermined count.

In the above embodiment, the document classification device has been described, wherein each of the keywords specified in the keyword exclusion conditions has a type number (type ID), and a minimum type set composed of type numbers in the keyword exclusion conditions is predetermined for each classification category, wherein the document matching unit 120 can identify the type of each keyword based on the type number, and wherein the partial text extraction unit extracts no piece of partial text when a combination of keyword type hits based on the keyword exclusion conditions includes the minimum type set.

In the above embodiment, the document classification device has been described, wherein the sample document extraction conditions for each classification category include the keyword search conditions and the keyword exclusion conditions in each of which a plurality of keywords are specified, wherein each of the keywords specified in the keyword search conditions and the keyword exclusion conditions has a type number (type ID), wherein a type set composed of type numbers in the keyword search conditions and the keyword exclusion conditions are predetermined for each classification category, wherein the document matching unit 120 can identify the type of each keyword based on the type number, and wherein the partial text extraction unit extracts no piece of partial text when a combination of keywords for which hits are found based on the keyword search conditions and keywords for which no hits are found based on the keyword exclusion conditions does not include the type set.

In the above embodiment, the document classification device has been described, wherein an electronic mail message is input as the sample target document, wherein the sample document extraction conditions for each classification category include mail address search conditions for searching for specific mail addresses included in an electronic mail header, and wherein the partial text extraction unit selects the number, size, and conditions of partial text to be extracted, according to a result of matching based on the mail address search conditions.

In the above embodiment, the document classification device has been described, wherein a Web page is input as the sample target document, wherein the sample document extraction conditions for each classification category include URL search conditions for searching for URLs, and wherein the partial text extraction unit selects the number, size, and conditions of partial text to be extracted, according to a result of matching based on the URL search conditions.

In the above embodiment, the document classification method has been described, by which a classification target document that is input is classified into one of a plurality of classification categories. The document classification method includes (1) inputting a plurality of sample documents (2) performing matching on each of the input sample documents based on sample document extraction conditions that are preset for each classification category, (3) extracting from each of the sample documents a piece of partial text to be used for learning, based on a result of the matching, and (4) performing machine learning by at least one algorithm, using the piece of partial text extracted for each classification category, so as to generate or update classification rules.

LIST OF REFERENCE SIGNS

100: document classification device, 110: document input unit, 120: document matching unit, 130: partial text extraction unit, 140: learning unit, 150: classification rule storage unit, 150-1: classification rules, 160: sample document extraction condition storage unit, 160-1: sample document extraction conditions, 161: keyword search conditions, 162: keyword exclusion conditions, 163: mail address search conditions, 164: URL search conditions, 210: classification target document input unit, 220: classification target document division unit, 230: classification unit, 240: classification result determination unit, 301: input document, 302: classification result, 300: network monitoring apparatus, 400: system

The invention claimed is:

1. A classification rule generation device comprising:
an input circuit that inputs a document as a sample target document;
a storage circuit that stores extraction conditions for extracting partial text which is a portion of the sample target document and which is used for generating classification rules for classifying a classification target document to be classified into one of classification categories, the partial text being extracted from the sample target document according to the classification categories, the extraction conditions being set for each of the classification categories;
a matching circuit that matches the sample target document input by the input circuit against the extraction conditions stored in the storage circuit;
an extraction circuit that performs partial text extraction to extract the partial text from the sample target document according to the classification categories, based on a result of matching by the matching circuit; and
a learning circuit that, when the partial text corresponding to one of the classification categories is extracted by the partial text extraction by the extraction circuit, performs predetermined machine learning using the partial text extracted, and generates the classification rules,
wherein the extraction conditions set for each of the classification categories include a keyword that corresponds to each of the classification categories,
the matching circuit includes a position identification circuit that identifies an existing position of the keyword for each of the classification categories in the sample target document,
the extraction circuit extracts a portion around and including the keyword as the partial text from the sample target document, based on the existing position of the keyword identified by the position identification circuit,
the extraction conditions set for each of the classification categories are set such that type information indicating a type of the keyword is set for at least one of the keywords, and
the extraction circuit, when extracting the partial text corresponding to each of the classification categories from the sample target document, performs the partial text extraction based on the type information indicated by the keyword identified by the position identification circuit.

2. The classification rule generation device according to claim 1,
wherein the extraction circuit, when extracting the partial text corresponding to each of the classification categories from the sample target document, does not extract the partial text corresponding to each of the classification categories from the sample target document when a count of type information indicating a specified type out of the type information of the keyword identified by the position identification circuit is less than a set value.

3. The classification rule generation device according to claim 1,
wherein the extraction circuit, when extracting the partial text corresponding to each of the classification categories from the sample target document, uses the sample target document as a target of extraction to extract the partial text corresponding to each of the classification categories only when the type information of the keyword identified by the position identification circuit includes the type information indicating a specified type.

4. The classification rule generation device according to claim 1,
wherein the extraction circuit, when extracting the partial text corresponding to each of the classification categories from the sample target document, changes a size of the partial text corresponding to each of the classification categories in accordance with the type indicated by the type information of the keyword identified by the position identification circuit.

5. The classification rule generation device according to claim 1,
wherein the extraction conditions set for each of the classification categories include at least one inappropriate keyword that does not correspond to each of the classification categories,
wherein the matching circuit includes a position identification circuit that identifies an existing position of the inappropriate keyword for each of the classification categories in the sample target document, and
wherein the extraction circuit excludes a portion around and including the inappropriate keyword from the sample target document, based on the existing position of the inappropriate keyword identified by the position identification circuit.

6. The classification rule generation device according to claim 5,
wherein the extraction conditions set for each of the classification categories are set such that type information indicating a type of the inappropriate keyword is set for at least one of the inappropriate keyword, and
wherein the extraction circuit, when extracting the partial text corresponding to each of the classification categories from the sample target document, performs the partial text extraction based on the type information indicated by the inappropriate keyword identified by the position identification circuit.

7. The classification rule generation device according to claim 6,
wherein the extraction circuit, when extracting the partial text corresponding to each of the classification categories from the sample target document, does not extract the partial text corresponding to each of the classification categories from the sample target document when a count of type information indicating a specified type out of the type information of the inappropriate keyword identified by the position identification circuit is equal to or more than a set value.

8. The classification rule generation device according to claim 6,
wherein the extraction circuit, when extracting the partial text corresponding to each of the classification categories from the sample target document, uses the sample target document as the target of extraction to extract the partial text corresponding to each of the classification categories only when the type information of the inappropriate keyword identified by the position identification circuit does not coincide with the type information indicating a specified type.

9. The classification rule generation device according to claim 6,
wherein the extraction circuit, when extracting the partial text corresponding to each of the classification categories from the sample target document, changes a size of an exclusion range to be excluded from the sample target document in accordance with the type indicated by the type information of the inappropriate keyword identified by the position identification circuit.

10. The classification rule generation device according to claim 5,
wherein the extraction circuit, when extracting the partial text corresponding to each of the classification categories from the sample target document, does not extract the partial text corresponding to each of the classification categories from the sample target document when a count of the inappropriate keyword identified by the position identification circuit is equal to or more than a set value.

11. The classification rule generation device according to claim 1,
wherein the extraction circuit, when a plurality of the partial text having an identical portion are extracted for each of the classification categories, integrates the plurality of the partial text into one piece of the partial text.

12. The classification rule generation device according to claim 1,
wherein the extraction circuit, when extracting the partial text corresponding to each of the classification categories from the sample target document, does not extract the partial text corresponding to each of the classification categories from the sample target document when a count of the keyword identified by the position identification circuit is less than a set value.

13. The classification rule generation device according to claim 1,
wherein the extraction circuit, when extracting the partial text corresponding to each of the classification categories from the sample target document, uses a predetermined range as the target of partial text extraction when a count of the keyword identified by the position identification circuit is equal to or more than a predetermined count within the predetermined range.

14. The classification rule generation device according to claim 1,
wherein the extraction conditions set for each of the classification categories include at least one of an appropriate keyword that is appropriate for each of the classification categories and an inappropriate keyword that is not appropriate for each of the classification categories,
wherein the matching circuit includes a position identification circuit that identifies existing positions of the appropriate keyword and the inappropriate keyword for each of the classification categories in the sample target document, and
wherein the extraction circuit extracts an area including only the appropriate keyword as the partial text from the sample target document, based on the existing positions of the appropriate keyword and the inappropriate keyword identified by the position identification circuit.

15. The classification rule generation device according to claim 14,
wherein the extraction conditions set for each of the classification categories are set such that type information indicating a type of the appropriate keyword is set for at least one of the appropriate keyword, and type information indicating a type of the inappropriate keyword is set for at least one of the inappropriate keyword, and
wherein the extraction circuit, when extracting the partial text corresponding to each of the classification categories from the sample target document, uses the sample target document as the target of extraction to extract the partial text corresponding to each of the classification categories when the type information of the appropriate keyword identified by the position identification circuit coincides with the type information indicating a specified type, and the type information of the inappropriate keyword identified by the position identification circuit does not coincide with the type information indicating a specified type.

16. The classification rule generation device according to claim 1,
- wherein the input circuit inputs an electronic mail message as the sample target document,
- wherein the extraction conditions of at least one of the classification categories out of the extraction conditions set for each of the classification categories include a specified mail address included in a header of the electronic mail message,
- wherein the matching circuit matches the sample target document against the mail address using the extraction conditions, and
- wherein the extraction circuit controls the partial text extraction in accordance with a result of matching using the mail address by the matching circuit.

17. The classification rule generation device according to claim 1,
- wherein the input circuit inputs a web page as the sample target document,
- wherein the extraction conditions of at least one of the classification categories out of the extraction conditions set for each of the classification categories include a uniform resource locator (URL),
- wherein the matching circuit matches the sample target document against the URL using the extraction conditions, and
- wherein the extraction circuit controls the partial text extraction in accordance with a result of matching using the URL by the matching circuit.

18. The classification rule generation device according to claim 1, further comprising:
- a division circuit that divides the classification target document according to an average size of the partial text extracted by the extraction circuit.

19. A classification rule generation device comprising:
- an input circuit that inputs a document as a sample target document;
- a storage circuit that stores extraction conditions for extracting partial text which is a portion of the sample target document and which is used for generating classification rules for classifying a classification target document to be classified into one of plural classification categories, the partial text being extracted from the sample target document according to the plural classification categories, the extraction conditions being set for each of the plural classification categories;
- a matching circuit that matches the sample target document input by the input circuit against the extraction conditions stored in the storage circuit
- an extraction circuit that performs partial text extraction to extract the partial text from the sample target document according to the plural classification categories, based on a result of matching by the matching circuit;
- a learning circuit that, when the partial text corresponding to one of the plural classification categories is extracted by the partial text extraction by the extraction circuit, performs predetermined machine learning using the partial text extracted, and generates the classification rules,
- wherein the extraction conditions set for each of the plural classification categories include a keyword that corresponds to each of the plural classification categories,
- the matching circuit includes a position identification circuit that identifies an existing position of the keyword for each of the plural classification categories in the sample target document,
- the extraction conditions set for each of the plural classification categories are set such that type information indicating a type of the appropriate keyword is set for at least one of the appropriate keywords, and
- the extraction circuit, when extracting the partial text corresponding to each of the plural classification categories from the sample target document, performs the partial text extraction based on the type information indicated by the keyword identified by the position identification circuit.

20. The classification rule generation device according to claim 19,
- wherein the extraction circuit extracts a portion around and including the keyword as the partial text from the sample target document, based on the existing position of the keyword identified by the position identification circuit.

21. A classification rule generation method that is executed by a classification rule generation device including an input circuit, a storage circuit, a matching circuit, an extraction circuit, and a learning circuit, the classification rule generation method comprising:
- using the input circuit, inputting a sample target document;
- using the storage circuit, storing extraction conditions for extracting partial text which is a portion of the sample target document and which is used for generating classification rules for classifying a classification target document to be classified into one of classification categories, the partial text being extracted from the sample target document according to the classification categories, the extraction conditions being set for each of the classification categories;
- by the matching circuit, matching the sample target document that is input by the input circuit against the extraction conditions stored in the storage circuit;
- by the extraction circuit, performing partial text extraction to extract the partial text from the sample target document according to the classification categories;
- by the learning circuit, when the partial text corresponding to one of the classification categories is extracted by the partial text extraction by the extraction circuit, performing predetermined machine learning using the partial text extracted, and generating the classification rules,
- by a position identification circuit, identifying an existing position of the keyword for each of the classification categories in the sample target document; and
- by the extraction circuit, extracting a portion around and including the keyword as the partial text from the sample target document, based on the existing position of the keyword identified by the position identification circuit,
- the extraction conditions set for each of the classification categories including a keyword that corresponds to each of the classification categories,
- the extraction conditions set for each of the classification categories are set such that type information indicating a type of the keyword is set for at least one of the keywords, and
- the extraction circuit, when extracting the partial text corresponding to each of the classification categories from the sample target document, performs the partial text extraction based on the type information indicated by the keyword identified by the position identification circuit.

22. A non-transitory computer storage medium having instructions stored therein that when executed by processing circuitry perform an information processing method according to claim 21.

* * * * *